L. E. OLMSTED.
PISTON RING CLAMPING TOOL.
APPLICATION FILED MAR. 13, 1916.
1,242,027.
Patented Oct. 2, 1917.
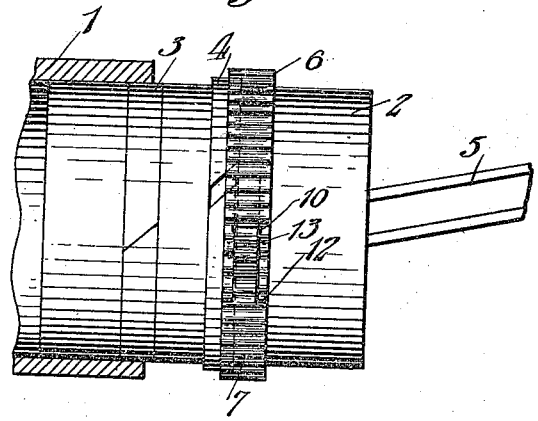
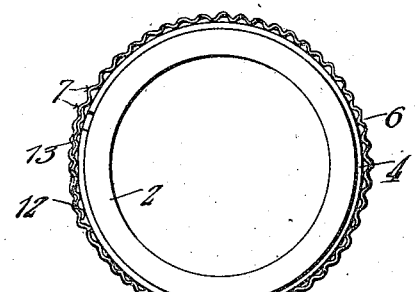
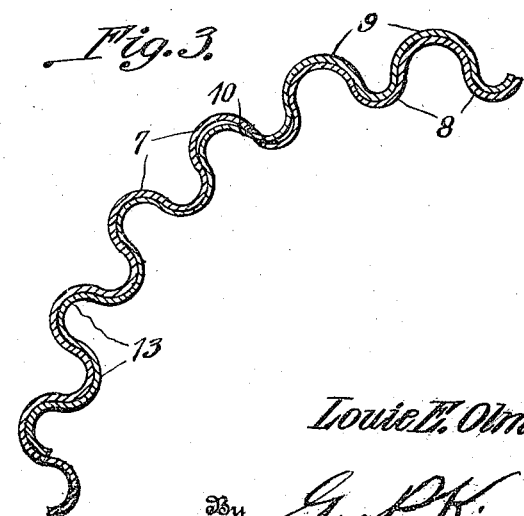
Louie E. Olmsted,
Inventor
By Geo. P. Kimmel.
Attorney

UNITED STATES PATENT OFFICE.

LOUIE E. OLMSTED, OF ST. JOSEPH, MISSOURI.

PISTON-RING-CLAMPING TOOL.

1,242,027.  Specification of Letters Patent.  Patented Oct. 2, 1917.

Application filed March 13, 1916. Serial No. 83,926.

*To all whom it may concern:*

Be it known that I, LOUIE E. OLMSTED, a citizen of the United States, residing at St. Joseph, in the county of Buchanan and State of Missouri, have invented certain new and useful Improvements in Piston-Ring-Clamping Tools, of which the following is a specification.

The present invention relates to assembling tools and more particularly to a piston ring clamping tool.

An object of my invention is to provide a clamping device for contracting piston rings flush with a piston in order to facilitate insertion of the piston into a cylinder, the clamping device preferably being in ring form and adapted to clamp about a piston ring for contracting the same.

Another object of my invention is to provide a clamping device of the character described which is light and durable in construction having automatic locking means associated therewith for gripping an object engaged thereby.

Other objects and advantages will appear from the following detail description and the claims, taken with an inspection of the accompanying drawing, in which—

Figure 1 is a side elevation of a piston having the usual piston rings, showing my invention applied thereto, Fig. 2 is an end elevational view of the same, and Fig. 3 is an enlarged fragmentary sectional view of the engaging end of my improved clamping device showing the improved locking means.

Referring more particularly to the drawing, in which similar characters of reference designate like and corresponding parts throughout the various views, 1 designates the end of a cylinder of any type having the usual piston 2 operable therein. The piston rings are designated 3 and 4 and are of the metallic split type commonly used in gasolene engines at the present time. The piston rod is designated 5.

My invention comprises preferably a body 6 circular in configuration and being provided with corrugations 7, the free ends of the body being arranged in overlapping relation to provide locking means hereinafter described in detail. In Figs. 1 and 2 this device is shown applied in operative position and is arranged about the piston packing ring 4 which is shown in expanded position. As best shown in Fig. 3 one end 8 of the clamping device 6 is overlapped by the opposite end 9. One of the corrugations 7 is apertured as at 10, and the end portion 9 is reduced as at 12 and having corrugations 13 to form a tongue for insertion through the opening 10, said tongue being engageable with the corrugations 7. The metal employed in my improved clamping device is preferably inherently resilient whereby the tongue portion 12 may be flexed when the corrugations 13 are engaging the corrugations 7.

In applying the device the clamping body 6 is placed about the piston and the free ends thereof, normally being in engagement, are relatively moved whereby the corrugations 7 and 12 will engage successfully to tighten the clamping member 6 about the packing ring 4, which consequently contracts the ring flush with the peripheral surface of the piston and permits the latter to be inserted into the cylinder as best shown in Fig. 1.

While it is not essential that the clamping device of my invention be corrugated throughout its circumference it will be found that this arrangement forms a better gripping engagement with the piston packing ring and also reinforces the clamping device. I desire to lay particular stress upon the improved locking means wherein the corrugations at the free ends of the clamping member engage to clamp an object. Of course, it will be understood that while my invention is shown as applied to inserting packing rings I do not limit myself to this use of the device. It will also be apparent that while the ends of the device preferably should be normally in engagement the said ends may be easily separated for removing the clamping ring when desired.

From the above description in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

In a device of the class described including, a corrugated band having the free extremities thereof arranged in crossed overlapping relation, one end of the band being provided with a transversely extending slot, the opposite end of the band being reduced forming a corrugated tongue portion adapted to be inserted in the slot, the corrugations of the tongue engaging the corrugations of the opposite end of the band for a purpose specified.

In testimony whereof I affix my signature hereto.

LOUIE E. OLMSTED.